Nov. 12, 1929.   W. H. FITCH   1,735,606
HEATING FURNACE
Filed Dec. 18, 1926   3 Sheets-Sheet 2
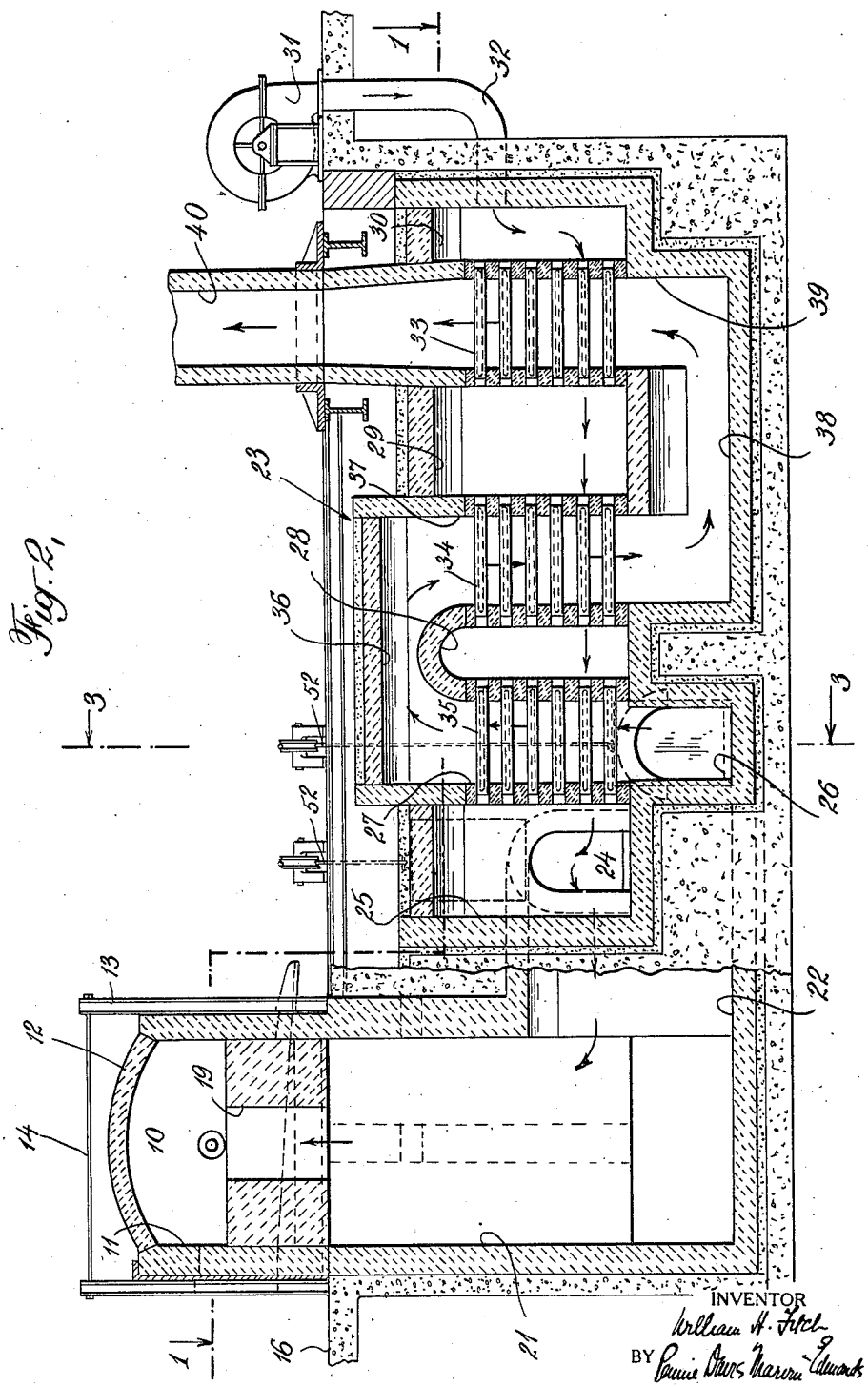

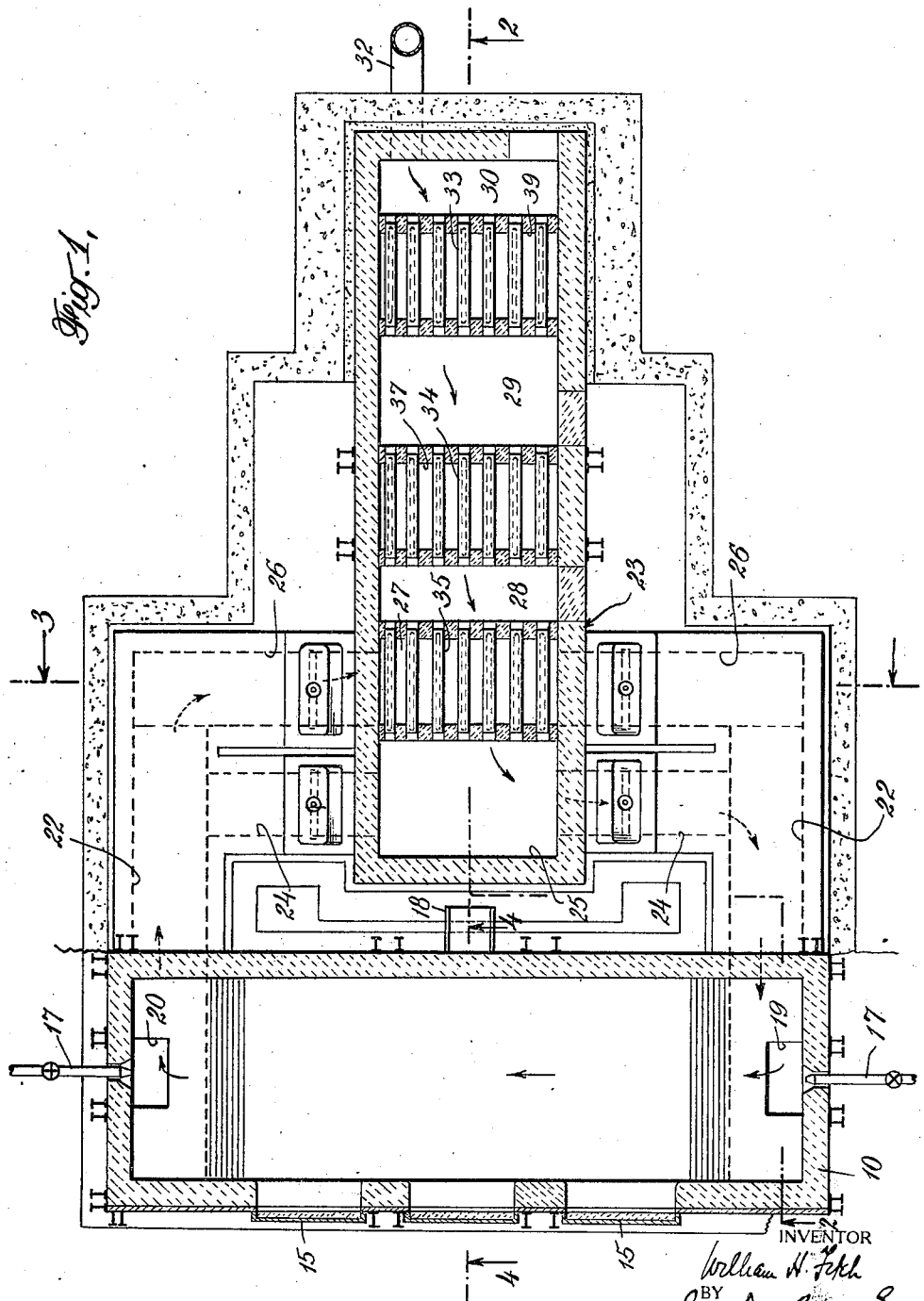

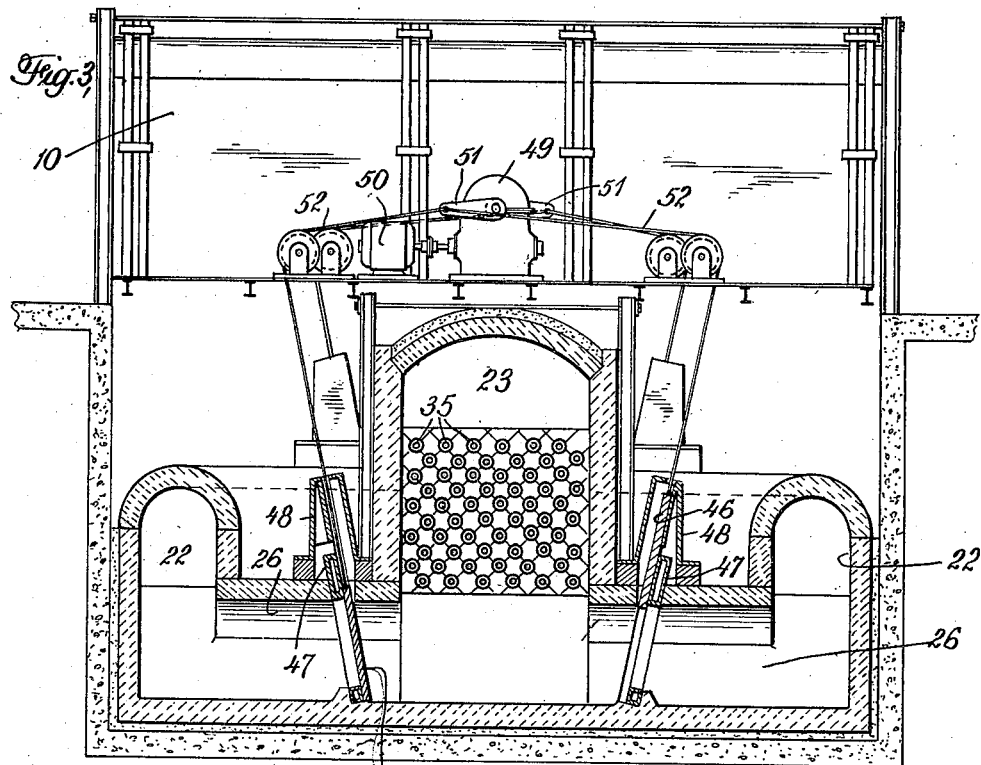
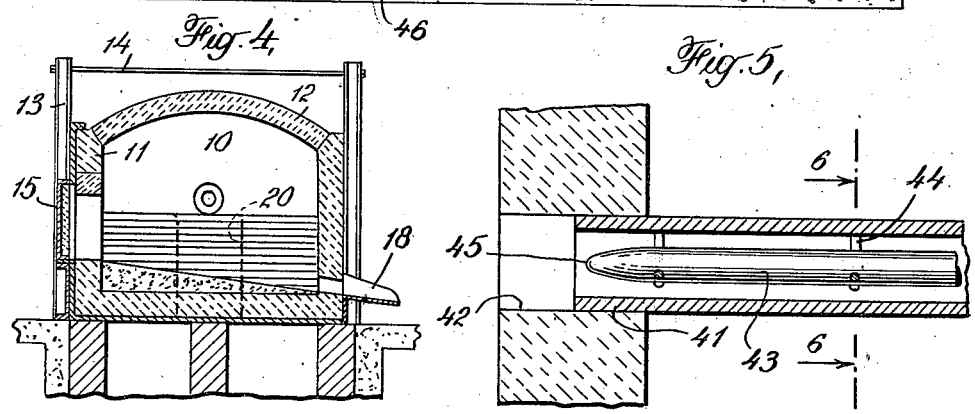

Patented Nov. 12, 1929

1,735,606

UNITED STATES PATENT OFFICE

WILLIAM H. FITCH, OF ALLENTOWN, PENNSYLVANIA

HEATING FURNACE

Application filed December 18, 1926. Serial No. 155,593.

This invention relates to furnaces of the reversing flame type, in which the direction of firing is reversed periodically, and has to do more particularly with a furnace of this type suitable for use in the manufacture of steel and for melting various materials. The furnace of the present invention is especially adapted for use as a reheating furnace in which ingots which have been laid in stock and allowed to cool to atmospheric temperature can be raised again to the temperature at which they are to be worked.

Present conditions in the steel industry are such that further reduction in the cost of the product can only be made by more efficient equipment, or more economical use of the fuel, since the cost of raw materials and labor cannot at present be further lowered. Accordingly, efforts have been made to recover the heat carried away from the furnace chamber by waste gases, and for this purpose regenerators have commonly been used. These structures include checker work, through which the hot burned gases from the furnace are directed, so as to raise the temperature of the checker work to a high degree. Then, as the direction of firing in the furnace is reversed, air for combustion is directed through the hot checker work so as to be preheated prior to its introduction into the furnace, while the cooled checkerwork in another regenerator is now being raised in temperature. These regenerative structures are not economical, due to their low efficiency, and to secure a good heat recovery a number of such structures are required, and the cost for installation and maintenance is high and they also occupy a large floor space.

The present invention is directed to the provision of a reversing furnace installation adapted for burning various fuels, such as pulverized coal, producer gas, and the like, which are supplied to the furnace chamber without preheating, the installation also including means for recovering a large proportion of the heat carried off by the waste gases. The installation includes a recuperative structure for waste heat recovery and this recuperative unit is provided with separate passageways for the air for combustion and the waste gases from the combustion chamber, these passageways being separated by walls through which an effective heat transfer can take place. The recuperator is connected to the combustion chamber by means of ducts which are connected both to the air and gas passageways within the recuperator, and control means are provided so that the flow of air and gases through the ducts may be alternated as the direction of firing is reversed. The recuperator which I prefer to employ in this installation has a novel construction, such that the air delivered to the furnace is raised to a uniform temperature throughout the furnace operation and the efficiency of this recuperator is such that it may displace a number of regenerators of much greater size. Accordingly, the present installation is one in which an excellent heat recovery is secured and the furnace and recuperator are so constructed and arranged as to occupy little floor space, while the flow of the hot gases and air is shortened so that little heat is lost by radiation.

For a better understanding of the invention, reference will be made to the accompanying drawings, in which Fig. 1 is a sectional view of the installation taken on the line 1—1 of Fig. 2, Fig. 2 is a vertical transverse section on the line 2—2 of Fig. 1, Figs. 3 and 4 are sectional views on the lines 3—3 and 4—4 respectively of Fig. 1, Fig. 5 is a fragmentary sectional view of a portion of a heat transfer element used in the recuperator, and Fig. 6 is a sectional view on the line 6—6 of Fig. 5.

The installation shown in the drawings is a reversing furnace used for reheating purposes, and this furnace includes a combustion chamber 10 of elongated shape, made of side walls 11 and an arch 12 braced by the usual buck stays 13 and tie rods 14. The furnace is provided with doors 15 in its front wall, through which the ingots or other articles to be heated may be inserted from the charging floor 16. In each end wall is an opening in which is mounted a burner 17 through which the fuel may be introduced into the furnace chamber, and the chamber is provided with a spout 18 through which refuse or slag may be withdrawn. The fuel used is supplied without preheating and when producer gas is used it is delivered direct from the producers at a temperature of approximately 1200° F. at the furnace port.

The burners 17 are adapted to be used in alternation and at opposite ends of the furnace in the floor thereof are openings 19 and 20, leading to dust chambers 21, one of which is disposed beneath each end of the furnace. Connected to each dust chamber through an opening in the side wall thereof near the bottom, is a duct 22 built in the foundation of the furnace and leading to the recuperator generally designated 23. The duct 22 has a branch 24 leading to a chamber 25 at one end of the recuperator, and a branch 26 leading to a passageway 27 in the recuperator separated by a wall from the chamber 25. The branches 24 and 26 are connected to the interior of the recuperator through openings in the wall thereof. The ducts 22 are of similar construction, and differ only in leading to opposite sides of the recuperator.

The recuperator 23 is of suitable masonary construction and of generally rectangular shape, lying with its axis at right angles to the axis of the furnace. The ducts 24 and 26 are connected to the recuperator at the end thereof which lies nearest the furnace, and the passage 27 to which the branch ducts 26 are connected serves as an inlet passage for hot gases from the furnace, while the chamber 25 in the recuperator is the air outlet chamber thereof. The recuperator includes a chamber 28 lying spaced from the chamber 25 and having a wall which in part defines the passage 27. Beyond the chamber 28 is another chamber 29 spaced therefrom, and at the end of the recuperator is a chamber 30 spaced from the chamber 29. The chamber 30 is the air inlet chamber into which air may enter from the atmosphere or be delivered, as, for instance, by the motor-driven fan 31 discharging air into the chamber through the duct 32. The air entering the chamber 30 flows across the chamber, as indicated by the arrows, then flows through a bank of tubes 33 leading to chamber 29. The air then flows across this chamber through a second bank of tubes 34 through the chamber 28, the third bank of tubes 35, and then to the chamber 25, whence the air flows into one or the other of the branch ducts 24.

The gases flowing from the combustion chamber through one or the other of the ducts 22, pass through the branch duct 26 into the passage 27, flowing upwardly through this passage and around and between the tubes in the bank 35 into the chamber 36 which extends around the top of the air chamber 28 and leads to a vertical passage 37 leading past the second bank of tubes 34. The gases flow from this passage into a longitudinal passage 38, around beneath the chamber 29, thence to the vertical passage 39, past the tubes in the bank 33, and passage 39 leading upwardly to the stack 40.

In flowing through the tubes in the banks 33, 34, and 35, the air is brought into heat transfer relationship with the hot gases, the tubes being made of a suitable material which permits effective heat transfer. The tubes are preferably made of a refractory material, such as silicon carbide, commonly known as carborundum, and the ends of the tubes are mounted in the adjacent walls of successive chambers. The air flowing into the first chamber 30 is heated by its passage through the tubes in the bank 33, but as the gases are somewhat cooled in flowing through the bank of tubes, some differences in temperature in the air might result, but for the fact that the air next flows into the chamber 29, which permits the air to mix thoroughly so that all parts of it are at a uniform temperature. The tubes as illustrated in Fig. 5, are mounted with their ends 41 lying in openings 42 in the walls of the air chambers, and these walls may be made of tile or the like, with openings for the tubes in which the ends of the tubes may be secured air-tight by means of caulking. Each tube also contains a "corebuster" 43 which may take the form of a fire clay rod, provided with legs 44 by which the rod is supported in the center of the tube. The rod has rounded ends, as shown at 45, so that the air can flow freely into the tube and is then caused to flow along the walls thereof in a relatively thin film. Thus the heating action is greatly increased in efficiency.

It will be seen that the gases are brought into heat transfer relationship with the air in a number of successive passes, during each of which the gases flow at right angles to the direction of air movement. Accordingly all parts of the tubes are exposed to the gases and no short circuiting can occur which would render parts of the tubes ineffective for the transfer of heat. Likewise, the repeated reversals of flow of the gases causes a precipitation of the solid materials which may be carried along with them, and the passages for the gases are provided with means of access through which these materials may be removed when occasion demands. The dust chambers 21 also permit the hot gases flowing from the furnace chamber to expand so that a precipitation of the solid residues of combustion is left in these chambers.

In order to control the direction of flow of the gases and air from the furnace to the recuperator, valve devices are provided, illustrated in Fig. 3. In each of the ducts 24 and 26 is provided a gate valve 46 resting against an inclined frame 47 which has an opening through its center, through which the gases may flow. The valve plate 46 is movable into a housing 48 by means of a control device 49 operated by a motor 50, the control device having an arm 51 on its shaft connected by a cable 52 to the valve plate 46. The valve device illustrated is duplicated in the other duct 26 and the two valve plates 46 are connected to the same arm 51 so that the control mechanism which is movable to one or the other of two positions may close one valve and open the other when it is brought to rest. This control mechanism likewise operates valves controlling the flow of gases through the ducts 24, and the arrangement of the control device is such that when one duct 26 is open, its associated duct 24 is closed, and similarly its associated duct 26 is closed while the other duct 24 is open. The valves may be water-cooled in accordance with standard construction, as well as the furnace doors, and the valve control mechanism is likewise of standard type.

In the construction as illustrated in Fig. 1, the burner at the right is being fired, so that air for combustion is flowing through the recuperator from the fan, thence outwardly through the duct 24 at the right of the recuperator and through duct to the end of the furnace at which the burner is admitting fuel. The gases of combustion flow outwardly from the furnace through the opening 20, downwardly into the dust chamber beneath, and thence through duct 22 to the branch duct 26, through which these gases are led into the passage 27 of the recuperator. The air and gases flow in opposite directions through the recuperator, and are brought into heat transfer relationship in successive stages between which the air enters mixing chambers so as to secure uniform temperature conditions throughout the body of air.

It will be noted that the chambers through which the air passes are successively narrow and wide, the chambers 30 and 28 being narrow, while the chambers 29 and 25 are wide. All the chambers are provided with doors or other means of access, through the walls of the structure and the narrow chambers serve for inspection purposes, admitting a workman for the purpose of inspecting the condition of the tubes. The wide chambers likewise permit a workman to examine the tubes, and these chambers are slightly wider than the tubes are long, so that when replacement is required, the damaged tubes may be moved into the wide chambers and the new ones inserted in position.

It will be seen that the present installation is compact so as to require little floor space, and the recovery of heat possible in a recuperator of this type is much greater than can be obtained with a regenerator of the same size. In order to accomplish the same recovery by the use of regenerative devices, much greater floor space would be required and the cost of maintenance would also be considerably greater. It will be noted that in the present arrangement the travel of the air and gases from the furnace chamber to the recuperator is relatively short and the air and gases flow through the recuperator in opposite directions, with the heated air passing directly from the end of the recuperator nearest the furnace into the furnace chamber, while the hot gases likewise flow into this end of the recuperator and pass outwardly at the far end through the stack. In this manner the loss of heat by radiation is reduced to a minimum and the floor space is used in a most economical manner.

While the present installation has been shown for purposes of illustration as including a reheating furnace, it is evident that other reversing furnaces, as, for instance, a soaking pit furnace, could be used in place of the reheating furnace with equally satisfactory results.

I claim:

1. A recuperator for use in connection with a furnace for transferring heat from the burned gases therefrom to the air used for combustion therein, which comprises a structure including a series of separate chambers, each pair of adjacent chambers being connected by a bank of tubes, an inlet for air leading to the series of chambers, a passage-way for conducting hot gases past the tubes, the passage-way surrounding all the tubes in each bank and connected so that the waste gases pass alternately upwardly and downwardly through each bank, and a stack directly above the last bank of tubes and communicating with the passage-way.

2. A recuperator for use in connection with a furnace for transferring heat from the burned gases therefrom to the air used for combustion therein, which comprises a structure including a series of banks of tubes, chambers between the banks of tubes, an inlet for air leading to the first bank of tubes, a passage-way for leading hot gases past successive banks of tubes in counter-flow with the air, the passage-way surrounding all the tubes in each bank and connected so that the waste gases pass alternately upwardly and downwardly through each bank, and a stack directly above said first bank and communicating with the passage-way.

3. A recuperator for use in connection with a furnace for transferring heat from the burned gases therefrom to the air used for combustion therein, which comprises a structure including a series of separate chambers, a bank of tubes across alternate chambers and connecting the remaining alternate chambers, an air inlet leading to the last named chambers, means for conducting hot gases through the first named alternate chambers and past the tubes so that the waste gases pass alternately upwardly and downwardly through each bank, and a stack forming part of one of said first named chambers.

4. A recuperator for use in connection with a furnace for transferring heat from the burned gases therefrom to the air used for combustion therein, which comprises a structure including a series of banks of air tubes, air chambers between the successive banks of tubes, means for conducting hot gases past the successive banks of tubes, a stack for receiving the hot gases from said passage-way past the last bank of tubes so that the waste gases pass alternately upwardly and downwardly through each bank, and air chambers on both sides of said last named bank.

5. A reversing flame chamber with fuel inlets at both ends in combination with a series of air chambers successively spaced from a point adjacent the middle of the combustion chamber, an exhaust adjacent to the first air chamber, air tubes interconnecting the air chambers, waste gas chambers surrounding the air tubes, ducts leading from the firing ends of the combustion chamber to the ends of the last air chamber with branch ducts to the first waste gas chamber, valves for selectively connecting either end of the combustion chamber at will with the first waste gas chamber and also the opposite end of the combustion chamber with the last air chamber, ducts connecting the waste gas chambers in series, and means for forcing the air into the first air chamber whereby the air is warmed in alternately distributed and mixed condition on its way to the burner and the waste gases flow in a tortuous path through the waste gas chambers substantially perpendicularly across the successive banks of air tubes.

6. The combination of claim 5 in which the air chambers are alternately longer and shorter than the connecting tubes whereby the latter may be received and replaced from the longer chambers.

In testimony whereof I affix my signature.

WILLIAM H. FITCH.